Patented Oct. 10, 1922.

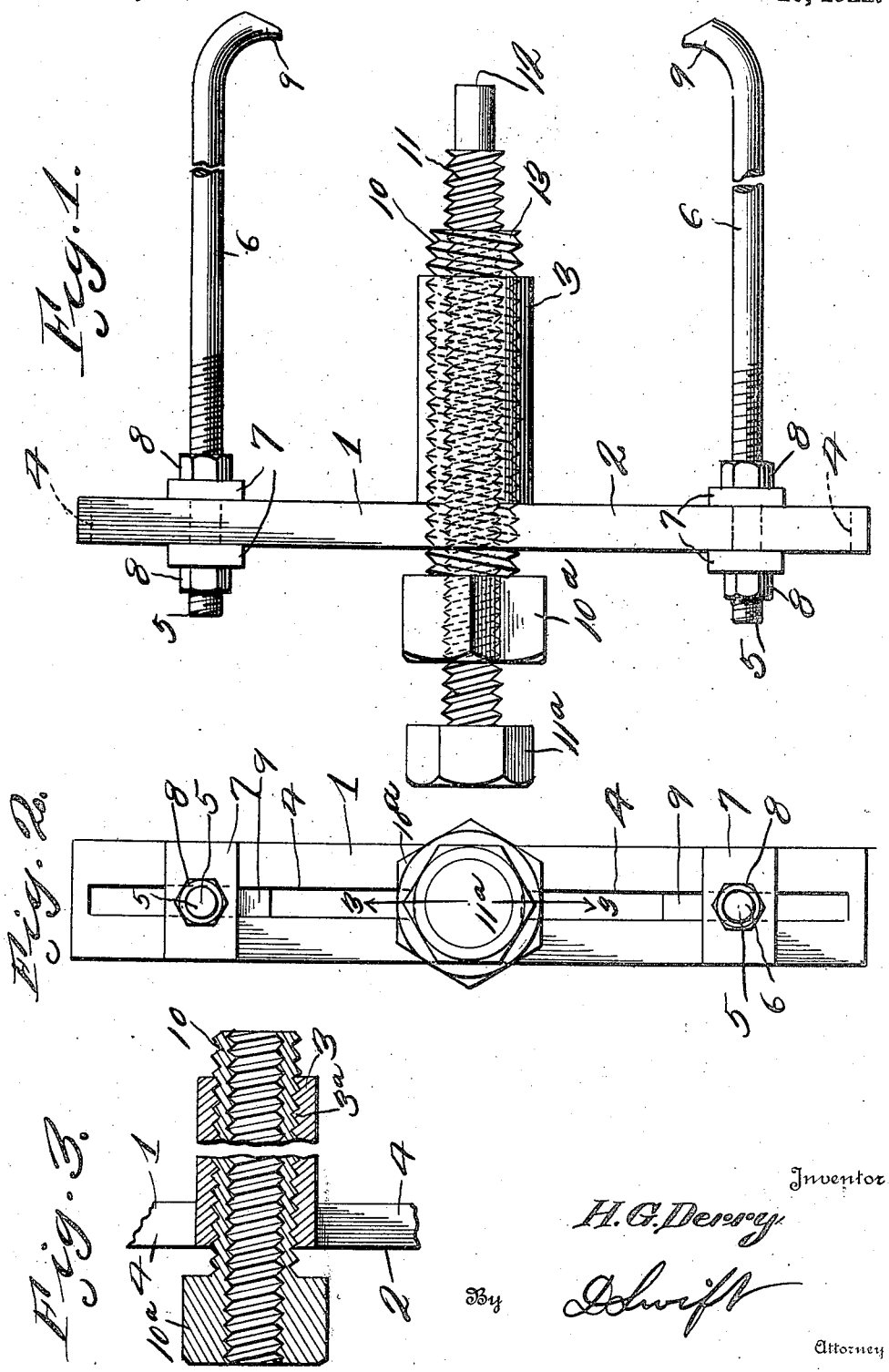

1,431,378

UNITED STATES PATENT OFFICE.

HERBERT G. DERRY, OF VERMONT, ILLINOIS.

WHEEL AND GEAR PULLER.

Application filed September 21, 1921. Serial No. 502,206.

*To all whom it may concern:*

Be it known that I, HERBERT G. DERRY, a citizen of the United States, residing at Vermont, in the county of Fulton, State of Illinois, have invented new and useful Wheel and Gear Pullers; and I do hereby declare the following to be a full, clear, and exact description of the invention such as will enable others skilled in the art to which it appertains to make and use the same.

The invention relates to wheel and gear pullers and has for its object to provide a device of this character comprising spaced, parallel disposed wheel or gear engaging bolts adjustably mounted in slots of a bar in such a manner that they may be adjusted inwardly and outwardly in relation to each other. Also to provide a shaft or axle engaging member comprising double screws, one of which is threaded through the other, the outer screw being threaded through an integral sleeve carried by the bar, said screw having oppositely disposed threads whereby during a wheel or gear removing operation maximum power will be obtained by rotating said screws in opposite directions.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the wheel and gear removing device.

Figure 2 is a front elevation of the device.

Figure 3 is a detail sectional view taken on line 3—3 of figure 2.

Referring to the drawings, the numeral 1 designates the frame of the device, which frame comprises a bar 2 having centrally disposed thereof and at right angles thereto a sleeve 3, which sleeve is provided with threads 3$^a$ through the same. The bar 2 on each side of the sleeve 3 is provided with slots 4, through which slots the outer ends 5 of wheel or gear engaging arms 6 extend, there being binding plates 7 which are forced into close and binding engagement with the inner and outer faces of the bar 2 by means of nuts 8. The ends 5 of the arms 6 are threaded, therefore it will be seen that the hooked ends 9 of the arms may be adjusted inwardly and outwardly in a horizontal plane as desired accordingly to the wheel or gear which is to be removed. By providing the nuts 8, the arms 6 may be adjusted inwardly to any position desired according to the size of the hub of the wheel, or to the diameter of a gear. When a wheel is being removed the hooks 9 may be turned in such a manner as to engage the spokes of the wheel when the same is being forced from the axle spindle. Said hooks when being used in connection with a gear are placed over the edge of the gear after they have been adjusted inwardly in such a manner that they will pull the gear from its shaft when the hollow bolt 10 is rotated, or the bolt 11 which is threaded through the hollow bolt 10. During the gear or wheel removing operation the end 12 of the bolt 11 is placed in engagement with the shaft or axle, and when so positioned and rotated so as to screw inwardly the frame 1 and arms 6 will be forced outwardly, thereby causing the wheel to be removed from the axle or the gear to be pulled from a shaft. It will be seen that by providing a double screw jacking means that a multiple and quick movement may be imparted at an increased power by rotating the screws 10 and 11 in opposite direction by placing on their heads 10$^a$ and 11$^a$ wrenches.

It is to be understood that the screws 10 and 11 may be manipulated in any way desired, however the best result is obtained by screwing the hollow screw 10 outwardly until the end 13 thereof has just a few threads in the sleeve 3. The inner bolt 11 is then screwed into the hollow screw 10 until a small portion of its end 12 extends through the end 13 of the hollow screw 10. Then the end 12 of the bolt 11 is placed against the end of the shaft from which the wheel or gear is to be pulled, and when either bolt 10 or 11 is screwed inwardly the wheel or gear is pulled from its position on the axle or shaft. If both screws are screwed inwardly simultaneously a quick pulling action is accomplished at a great power. It will be seen that by manipulating the screws independently of each other that gears or wheels may be also pulled from their position.

From the above it will be seen that a wheel and gear puller is provided which is simple in construction and one wherein the parts are reduced to a minimum and so constructed that the same may be easily placed in position, and one wherein the maximum efficiency is obtained.

The invention having been set forth what is claimed as new and useful is:—

A device of the character described comprising a bar having slots adjacent its ends, a wheel or gear engaging arm adjustably mounted for outwardly or inward movement in said slots, an integral sleeve interiorly threaded disposed at a right angle to said bar and in the same plane and in parallel relation to the arms, means carried by the arms for engaging and holding a wheel or a gear, a hollow bolt threaded through the threaded sleeve, a bolt threaded through the hollow bolt and of greater length than the hollow bolt, said hollow bolt being provided with left hand thread and the bolt threaded through the hollow bolt being provided with right hand threads.

In testimony whereof I have signed my name to this specification in the presence of two subscribing witnesses.

HERBERT G. DERRY.

Witnesses:
HARRY OBBICK,
GLENN HERRON.